United States Patent [19]
Sharp

[11] Patent Number: 4,607,522
[45] Date of Patent: * Aug. 26, 1986

[54] STORAGE TANKS HAVING SECONDARY CONTAINMENT MEANS

[76] Inventor: Bruce R. Sharp, 4090 Rose Hill Ave., Cincinnati, Ohio 45229

[*] Notice: The portion of the term of this patent subsequent to Jun. 18, 2002 has been disclaimed.

[21] Appl. No.: 740,869

[22] Filed: Jun. 3, 1985

Related U.S. Application Data

[63] Continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned.

[51] Int. Cl.⁴ .............................................. G01M 3/32
[52] U.S. Cl. ..................................... 73/49.2; 220/449
[58] Field of Search ............ 73/49.2, 49.3, 40, 40.5 R, 73/40.7; 340/605; 220/449, 461, 85 B

[56] References Cited

U.S. PATENT DOCUMENTS

| | | | |
|---|---|---|---|
| 3,995,472 | 12/1976 | Murray | 73/49.2 X |
| 4,408,628 | 10/1983 | Monk | 73/49.2 X |
| 4,523,454 | 6/1985 | Sharp | 73/49.2 |
| 4,524,609 | 6/1985 | Sharp | 73/49.2 |

FOREIGN PATENT DOCUMENTS

| | | | |
|---|---|---|---|
| 1150248 | 6/1963 | Fed. Rep. of Germany | 73/49.2 |
| 1194209 | 6/1965 | Fed. Rep. of Germany | 73/49.2 |
| 2141041 | 2/1973 | Fed. Rep. of Germany | 73/49.2 |
| 2156496 | 5/1973 | Fed. Rep. of Germany | 73/49.2 |
| 2225456 | 12/1973 | Fed. Rep. of Germany | 73/49.2 |

Primary Examiner—Stewart J. Levy
Assistant Examiner—Joseph W. Roskos
Attorney, Agent, or Firm—Charles R. Wilson

[57] ABSTRACT

A storage tank system especially useful for storing liquid gasoline in one aspect comprises a rigid inner tank encased by a flexible outer jacket with a leak detecting means associated with the closed space between the inner tank and jacket. In another aspect, an outer rigid tank contains a bladder within it together with leak detecting means between the tank and bladder. The system results in a storage facility which is less likely to lose its stored liquid to the environment due to a slow leak or a sudden large leak such as is possible with an earthquake.

11 Claims, 6 Drawing Figures

STORAGE TANKS HAVING SECONDARY CONTAINMENT MEANS

This application is a continuation-in-part of "External Jacket System As Secondary Containment for Storage Tanks," Ser. No. 06/544,013, filed Oct. 21, 1983, now U.S. Pat. No. 4,523,454 and "Storage Tank Systems," Ser. No. 06/580,800, filed Feb. 16, 1984, now U.S. Pat. No. 4,524,609 which is a continuation-in-part of Ser. No. 06/544,012, filed Oct. 21, 1983, now abandoned.

This invention relates to liquid storage tank systems. More particularly the invention relates to storage tank systems having improved leak prevention means and leak detection means.

BACKGROUND OF INVENTION

Storage tanks are used throughout the world for storing various liquids in bulk form. In particularly, storage tanks are used extensively for the storage of liquid gasoline at retail gasoline stations. Necessarily, these stations are in populated areas and, therefore, there is always a danger associated with leaks from the tanks. Leaked gasoline poses a hazard to the environment as well as an obvious health hazard. The known problem is particularly troublesome in that gasoline storage tanks are usually buried underground and any leaks which develop are normally very slow initially. This means that any leak which does start is difficult to detect until a substantial amount of gasoline has leaked. By that time environmental damage and possible health problems have occurred. The time and expense needed to clean up a gasoline spill can be enormous. It could involve initially emptying the storage tank and removing the emptied tank from the ground. The ground surrounding the tank would have to be decontaminated, a procedure which could be extensive in case of a slow leak which is not detected early or a sudden large leak. In addition to the expense of the above clean-up, there is the loss of profits due to the down-time involved not only with the damaged tank but also possibly the whole gasoline station. The health hazards associated with a gasoline spill can also be enormous in case of an accidental fire or drinking water contamination.

Underground storage tanks are particularly troublesome in those areas that are prone to earthquakes. Typical underground storage tanks are constructed of metal or fiberglass. Any earthquake is likely to cause a crack in the tank with a consequent leak. If the leak is slow, the same problems as above discussed exists. If the leak results in a large sudden loss, the problem is readily detected, but only after it is too late.

The problems associated with the present underground storage tanks are well known. Various attempts have been made to alleviate the problems. Several different types of leak detectors are presently being marketed in order to detect even slow leaks. A reliable leak detector would be of some value in that a leak which is detected early enough can be corrected. This may involve the emptying of the tank under controlled conditions and the repair of the tank. Such an operation would be expensive; however, it would solve the problem. Another attempt to solve the known problems has been the use of vault systems. In a vault system, the rigid storage tank is surrounded by another rigid tank or shell which acts as a containment vessel if the storage tank develops a leak. A slow leak in the storage tank is satisfactorily contained. However, in those areas prone to earthquakes, it is quite possible the storage tank and the outer rigid tank or shell would both be damaged.

There has now been discovered a liquid tank storage system which solves many of the problems inherent with the existing systems. The system of this invention is economical and provides a measure of protection in earthquake-prone areas not available previously.

SUMMARY OF THE INVENTION

The present invention is concerned with liquid storage tanks. One aspect of the new system comprises (1) a rigid inner tank having a fill pipe, dispensing line and, optionally, vent pipe (2) a flexible jacket encasing the inner tank, (3) a gas pervious material between the inner tank and flexible jacket and (4) detection means associated with the space occupied by the gas pervious material for detecting leakage. A second aspect of the new system comprises (1) an outer tank shell having rigid walls with fill pipe, dispensing line and vent pipe, (2) gas pervious material adhered to the inner surface of the tank shell, (3) a flexible bladder adapted to fit within the outer tank shell and adhered to the gas pervious material, and (4) a detection means in communication with the space occupied by the gas pervious material. Any leak which occurs in the storage compartment is contained within the outer structure and is detected by the detection means.

BRIEF DESCRIPTION OF THE DRAWINGS

FIG. 1 is a side view, partially in section, of the improved storage tank system wherein a probe or sight tube is used for detecting leakage.

FIG. 2 is a cross-section view taken along lines 2—2 of FIG. 1.

FIG. 3 is a side view, partially in section, of a storage tank system wherein a a vacuum means and a gas analyzer are used for detecting leakage.

FIG. 4 is a side view, partially in section, of an embodiment of the invention wherein means to maintain non-atmospheric pressure and a pressure change sensor are used to monitor leakage.

FIG. 5 is a side view, partially in section of a storage tank system using a sight tube to detect leakage.

FIG. 6 is a horizontal cross-section taken along line 6—6 of FIG. 5.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

JACKETED STORAGE TANK

Figure 1:
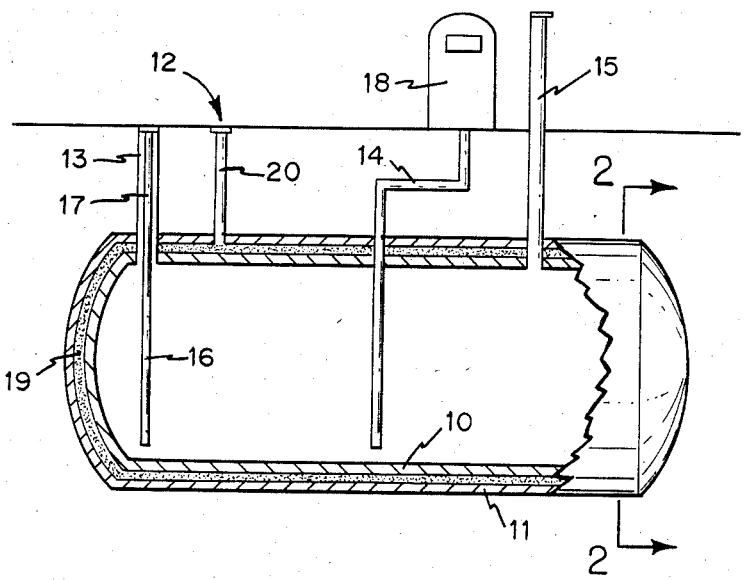
FIGS. 1-3 illustrate the new system wherein a flexible jacket is used to encase a rigid inner tank.

With reference to FIG. 1, the present invention comprises a rigid inner tank 10, a flexible jacket 11 encasing the inner tank 10, and detection means 12 associated with the space between the inner tank 10 and outer jacket 11. The rigid inner tank is made of metal such as steel or a resin reinforced fiberglass material. Such tanks are well known and are commonly used for storage of various liquids. Connected to the inner tank 10 are a fill pipe 13 communicating with the ground surface, dispensing line 14 for withdrawing gasoline and vent pipe 15.

The fill pipe 13 provides as its obvious function the means by which gasoline can be pumped into the inner tank from an outside source, e.g. a tank truck. As illustrated in FIG. 1, fill pipe 13 comprises a line 16 through which gasoline flows to the inner tank 10 and a space 17 within the fill pipe which acts as a vapor recovery line. As gasoline is pumped into the inner tank, gasoline vapors which are formed are sucked through the space 17 back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank; it can be single pipe, but more often has vapor recovery means associated with it and is often referred to as a vapor recovery fill line. As shown in FIG. 1, line 16 extends into the inner tank 11 with its end near the bottom.

Dispensing line 14 is used for withdrawing gasoline and delivering it to the consumer through gasoline dispenser 18. While not illustrated in FIG. 1, a pump is positioned within the inner tank, dispensing line or gasoline dispenser for pumping gasoline to the dispenser. The bottom of the dispensing line 14 is in close proximity with the bottom of the inner tank 10. The vent pipe 15 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid inner tank by known means.

Jacket 11 is constructed of a flexible material of sufficient strength to contain the gasoline in case of a leak. The jacket can be made of a synthetic polymeric material, including an elastomeric material such as rubber, e.g. Buta-n, neoprene, and fluoroelastomer, e.g. Viton, polyester, e.g. vinylesters, polyethylene (preferably a low density polyethylene), polypropylene, polyvinylchloride, polyurethane, polyepoxie and various fiber reinforced, fabric and vinyl backed sheets of any of the foregoing materials as well as material constructed of two or more of the foregoing materials, e.g. fluoroelastomer coated polyethylene. The listed materials used in construction of the jacket are not all inclusive, but only illustrative of some of the materials that can be used. Preferably, the jacket is made of at least one material which is gasoline impervious. The shape of the jacket 11 is such that it encases the rigid inner tank 10 to form a closed space between said jacket and the inner tank. Preferably the jacket is sized to hold up to 200% of the inner tank's contents.

The jacket is provided with openings for allowing the fill pipe 13, dispensing line 14 and vent pipe 15 to pass there through. The method by which the pipes and dispensing line are attached to the jacket is not important to the invention herein. Thus, any means suitable for providing a sealed connection can be used.

The space between the inner tank 10 and the jacket 11 is closed. Gas pervious material 19 occupies this closed space and effectively maintains a space relationship between the jacket and the tank. The material is such that any leakage which may occur will flow to the bottom of the jacket where it can be readily detected. Without the gas pervious material, a leak can be temporarily closed by the flexible jacket being forced against the tank by pressure from ground fill, thereby giving a false sense of security. The gas pervious material prevents this from happening. The gas pervious material is a continuous foraminous or porous matting material having various physical shapes and structures variously referred to as mattings, nets, screens and meshes. Jute, polyurethane foam, fiberglass matting, cotton matting, nylon matting and asbestos are examples of materials which can be used.

Detection means 12, as shown in FIG. 1, can be any of various known means used for detecting the presence of a selected liquid or gas. The detector is in, all cases, in communication with the closed space through the access tube 20. In one embodiment, a probe extends through the access tube down to or near the bottom of the jacket. The probe is capable of detecting the presence of leakage from the inner tank or leakage through the jacket, e.g. water. The probe is chosen so as to detect selected gases or liquids.

In another embodiment, access tube 20 merely allows for visual observation of the closed space. It can extend to the bottom of the jacket, though this is not necessary. It can further extend along the bottom of the jacket and be provided with perforations to permit any leakage to enter. Any leakage can be observed ultimately as the access tube fills to the point of ground observation.

Figure 3:
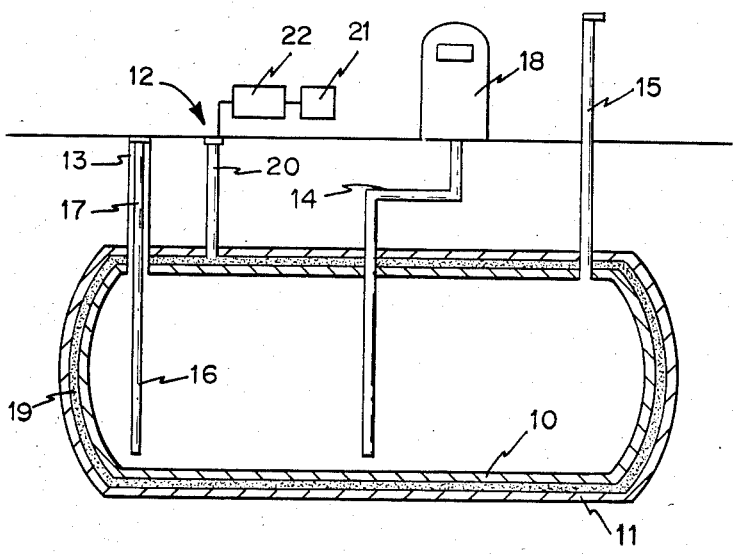

Still another leak detection means, shown in FIG. 3, utilizes a negative pressure throughout the closed space. Detection means 12 associated with the closed space between the inner tank 10 and jacket 11 is a gas analyzer 21 capable of detecting any leakage resulting from a leak in the jacket or inner tank. Conventional vacuum means 22 is used for providing negative pressure to draw the contents of the closed space to the gas analyzer for analyses. Gas analyzers are used well known and can be selected to detect the liquid being stored or water.

In a preferred embodiment, alarm means are associated with the leak detection means to alert an attendant to any leaking. Any alarm means which can be set off by gasoline or water vapor presence can be used.

Still another embodiment of the invention uses at least one additional flexible jacket to encase the fill pipe 13 and/or dispensing line 14. This additional jacket can be an extension of the jacket encasing the inner tank or is independent thereof. The material and mode of operation for the jacket encasing the inner tank applies as well to the jacket encasing the fill pipe and/or dispensing line.

In operation, the inner tank is filled with gasoline in normal fashion. Any leakage in the tank or jacket will be detected by the detecting means. Preferably, alarm means will alert an attendant to the problem so that immediate corrective action can be taken. A large leak in the inner tank such as could be caused by an earthquake will result in a substantial loss of stored liquid from the tank. However, the flexible nature of the jacket will withstand the sudden stress caused by the earthquake and confine the leaked gasoline. Subsequent clean-up can occur as time permits without concern for the safety of the environment or the health of residents.

STORAGE TANKS WITH BLADDER

Figure 2:
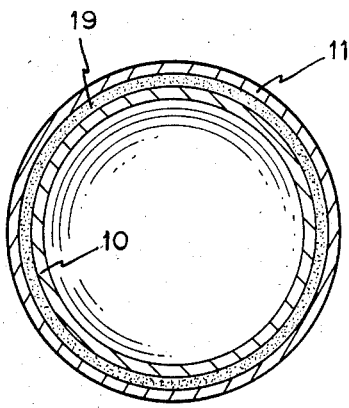
Figure 4:
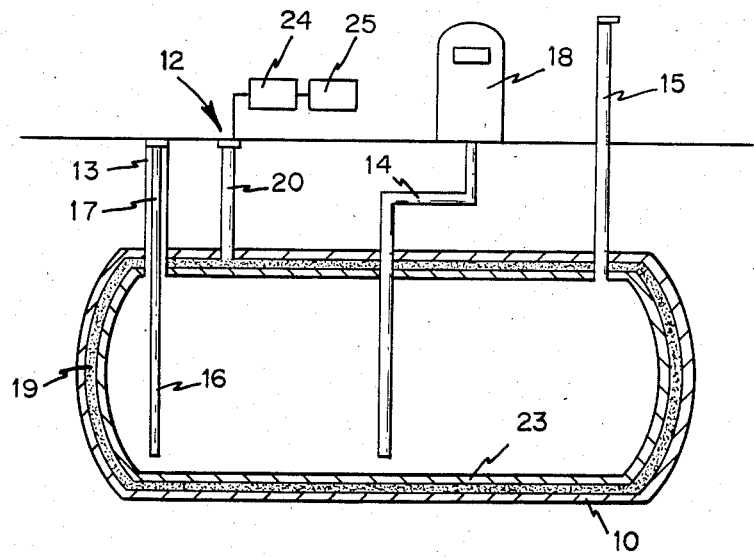
FIGS. 4-6 illustrate the new system wherein a flexible bladder is used to hold the stored liquid.

As shown in FIG. 4, a bladder 23 is installed in a rigid outer tank shell 10 with a gas pervious material 19 between it and the tank shell. The gas pervious material can be the same as that described with reference to FIGS. 1, 2 and 3. The fill pipe 13 and dispensing line 14 fulfill their functions in a manner as described above with the other embodiments. Optional vent pipe 15 extends through the bladder 23 to communicate with the bladder's interior. Access line 20 communicates with the space occupied by the gas pervious material 19.

Means 24 is in communication with the closed space occupied by the gas pervious material 19 to maintain a non-atmospheric pressure in the space. In one embodiment, the means 24 is an air pressure means and a positive pressure is maintained in the closed space. A pressure change sensor 25 associated with the air pressure means is used to determine when a pressure drop is experienced. A drop in the air pressure or an abnormal requirement placed on the air pressure means to maintain a pre-set air pressure in the closed space is an indication either the outer tank shell or bladder has developed a leak. In either case, sufficient time should exist to repair the source of leakage. The presence of the gas pervious material in the closed space maintains a spaced relationship between the tank shell and bladder, thereby aiding the operation of the pressure change sensor 25.

The main advantage that this embodiment of the invention enjoys is it is readily adapted to existing storage systems. Thus, the fill pipe and vapor recovery means presently being used would still function the same with this embodiment. The gas pervious material and bladder can be readily installed in a buried storage tank.

Adhesive means are used to bond the gas pervious material to the walls of the outer shell and the bladder for ease of installation of the total system. As used herein, "adhesive means" is used to broadly describe many bonding techniques. For example, adhesive commercially available for bonding together two or more substrates can be used. Also, when existing tanks are given a lining for either repair or protective purposes, a resinous coating is applied in one or more applications. The resinous coating prior to hardening can be used as the adhesive means for bonding the gas pervious material to the walls of the outer tank shell. This latter described embodiment of the invention is particularly attractive to those businesses which are concerned with the repairing or rejuvenating of existing storage tanks. Thus, a storage tank can be given sufficient applications of a liner material (generally a polyester or epoxy coating applied by spray) until the tank is repaired or rejuvenated. In the past, such a tank was then put back into operation. However, by this invention, the gas pervious material is applied while the last application of liner material is still in a tacky state. Thereafter, the bladder is installed. The resultant tank is now not only repaired or rejuvenated, but also has another means to contain the stored gasoline and has leak analysis capability---both features being a meaningful upgrading of the existing storage tank.

In another embodiment, means 24 is a vacuum pump and a negative pressure is maintained in the closed space. In this embodiment, it is not necessary that the gas pervious and bladder be adhered to the walls of the outer shell. That is, the vacuum drawn in the closed space is sufficient to maintain a viable storage tank system.

Figure 5:
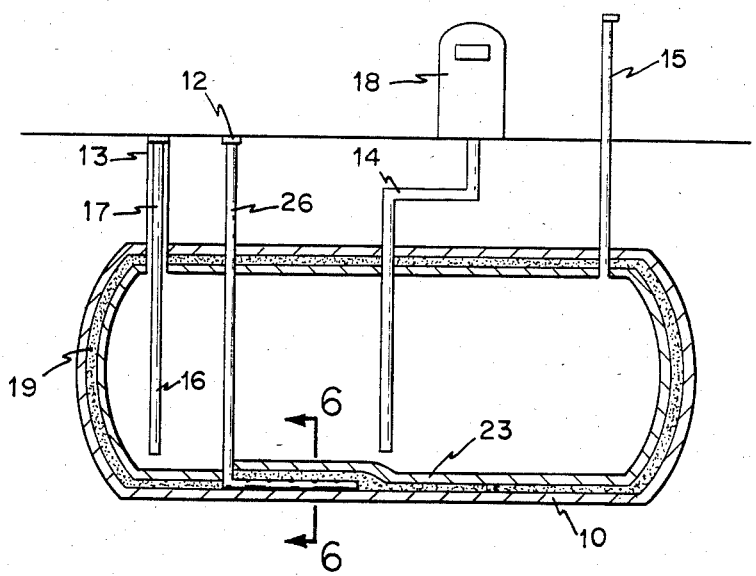
Figure 6:
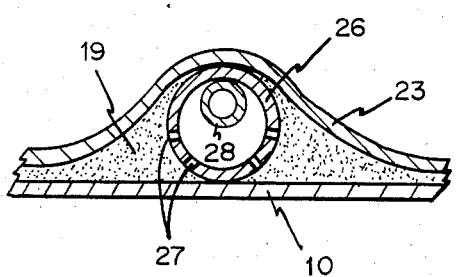

Still another embodiment, which is similar to that described immediately above, utilizes the access tube for detecting any leakage. As shown in FIGS. 5 and 6, the access tube 26 can extend from ground level into the closed space and down to the underside of the bladder 23. The access tube preferably further extends along the bottom of the tank shell and contains perforations 27 to allow any leaked substance to enter the sight tube where eventually it will be detected by visual observation. Alternatively, a pressure or vacuum tube 28 can be positioned within the access tube 26 to aid in detecting leakage which has collected in the sight tube. As with the embodiment depicted in FIG. 4, this embodiment is readily adapted to existing underground gasoline storage tanks.

Operation of the systems described with reference to FIGS. 4–6 is very similar to existing systems as far as the filling, dispensing and vapor recovery steps. Any bladder or tank damage is detected readily and can be repaired. The flexible nature of the bladder allows it to withstand an earthquake.

What is claimed is:

1. A storage tank system for liquids having secondary containment capability and leakage detection capability, comprising:
   (a) a rigid inner tank for storing the liquid, having fill pipe and dispensing line;
   (b) a flexible jacket encasing the inner tank so as to form a closed space between the tank and the jacket;
   (c) a gas pervious material positioned between the rigid inner tank and the flexible jacket, said material capable of allowing any leaked liquid from the storage tank or water outside the flexible jacket to pass through it; and
   (d) detecting means associated with the closed space occupied by the gas pervious material for detecting leakage into or from either of said tank and jacket.

2. The storage tank system of claim 1 wherein the flexible jacket is made of a synthetic polymeric material.

3. The storage tank system of claim 2 wherein the flexible jacket is made of an elastomeric material.

4. The storage tank system of claim 1 wherein the detecting means is a probe which extends to the lower portion of the rigid inner tank, said probe capable of detecting selected gases or liquids.

5. The storage tank system of claim 4 wherein the gas pervious material is jute, polyurethane foam, fiberglass matting, cotton matting, nylon matting or asbestos.

6. The storage tank system of claim 5 wherein the inner tank is used for the storage of gasoline.

7. The storage tank system of claim 1 wherein the detecting means is an access tube which extends to the closed space whereby a leaked substance can be detected.

8. The storage tank system of claim 7 wherein the gas pervious material is jute, polyurethane foam, fiberglass matting, cotton matting, nylon matting or asbestos.

9. The storage tank system of claim 1 wherein a vacuum is maintained in the closed space and the detection means is a gas analyzer capable of chemically detecting selected gases or liquids withdrawn by the vacuum means.

10. The storage tank system of claim 9 wherein the gas pervious material is jute, polyurethane foam, fiberglass matting, cotton matting, nylon matting or asbestos.

11. The storage tank system of claim 1 further comprising a vent pipe in communication with the interior of the rigid inner tank.

* * * * *